United States Patent [19]

Watanabe et al.

[11] 3,882,692
[45] May 13, 1975

[54] FUEL COOLING DEVICE IN AN AUTOMOTIVE VEHICLE EQUIPPED WITH AN AIR CONDITIONER

[75] Inventors: Takeaki Watanabe, Yokosuka; Hiroshi Sakasegawa; Kuniyuki Tanabe, both of Yokohama, all of Japan

[73] Assignee: Nissan Motor Company Limited, Yokohama, Japan

[22] Filed: June 11, 1974

[21] Appl. No.: 478,260

[30] Foreign Application Priority Data
June 13, 1973 Japan.............................. 48-69882

[52] U.S. Cl. ...................... 62/316; 62/285; 62/291; 62/244; 62/323; 123/41.22; 123/41.33; 123/139 AV

[51] Int. Cl............................................. F28d 5/00
[58] Field of Search ............. 62/316, 285, 291, 244, 62/323; 123/41.22, 41.31, 139 AV

[56] References Cited
UNITED STATES PATENTS

| | | | |
|---|---|---|---|
| 2,120,779 | 6/1938 | Ericson | 62/316 |
| 2,514,253 | 7/1950 | Partin | 62/316 |
| 2,766,597 | 10/1956 | Gieck | 62/316 |
| 3,199,307 | 8/1965 | Willis | 62/291 |

Primary Examiner—William J. Wye

[57] ABSTRACT

Fuel cooling device employing water accumulated in a reservoir from a refrigerant evaporator comprises a heat exchanger to cool a fuel supply pipe. Water, which is cool, is supplied to the heat exchanger from the reservoir.

5 Claims, 2 Drawing Figures

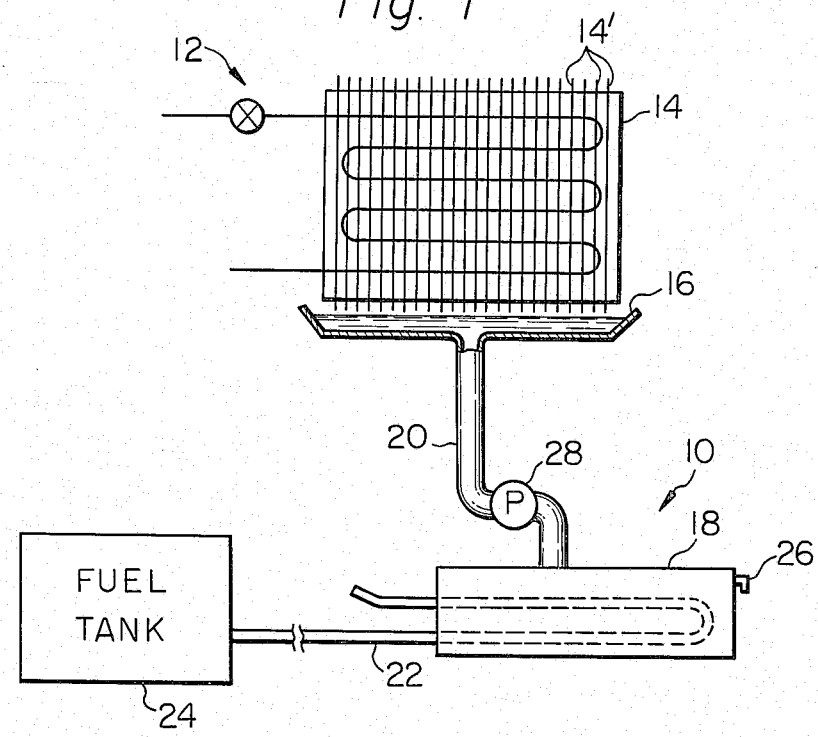
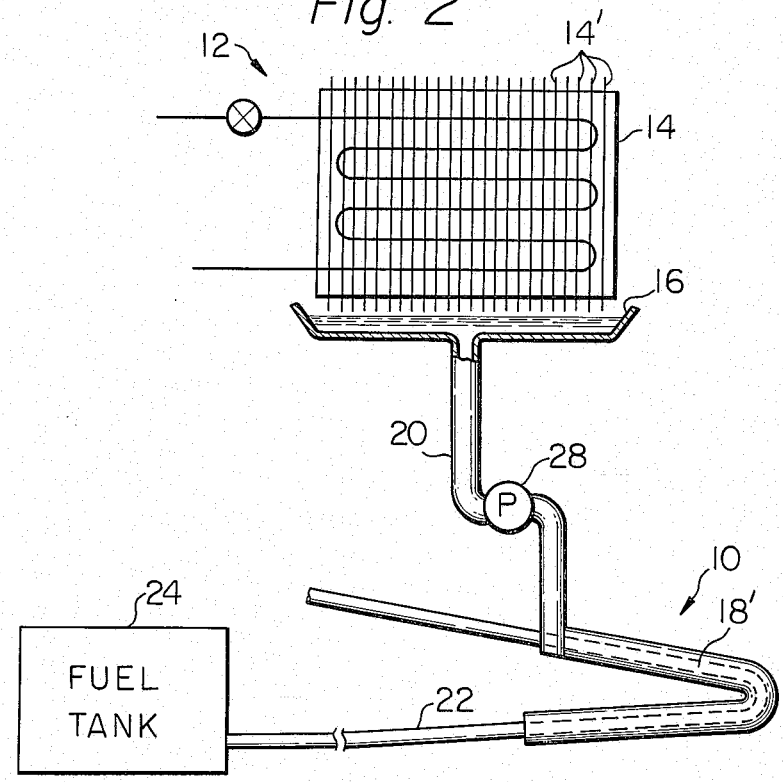

FUEL COOLING DEVICE IN AN AUTOMOTIVE VEHICLE EQUIPPED WITH AN AIR CONDITIONER

The present invention relates to a cooling device for a fuel supply system in an automotive vehicle which is equipped with an air conditioner having a refrigerant evaporator.

There is a tendency to provide an automotive vehicle with a reactor and/or catalytic converter, as exhaust gas purifiers, for the purpose of reducing toxic components in the exhaust gas. However, the provision of such exhaust gas purifiers will cause an excessive temperature increase about the fuel supply system and, in excessive cases, vapor locking or percolation results. Hence, a cooling device for a fuel supply system is necessary. A cooling device is also necessary for an automotive vehicle which would run within a high temperature area, such as a tropical region.

It has been proposed to circulate the cooling medium in the refrigerant cycle of an air conditioner about a fuel supply pipe to keep the fuel cool. However, under these conditions cooling efficiency of the air conditioning system is impaired.

It is, therefore, an object of the present invention to provide a fuel cooling device for an automotive vehicle equipped with an air conditioner having a refrigerant evaporator, which will not affect the cooling efficiency of the air conditioner.

It is a further object of the present invention to provide a simple fuel cooling device of the above nature.

The above objects, features and advantages of the present invention will become apparent from the following description of two preferred embodiments of the present invention with reference to the accompanying drawings, in which:

FIG. 1 is a schematic view of a fuel cooling device, showing a first embodiment of the present invention; and FIG. 2 is a similar view to FIG. 1 showing a second embodiment of the present invention.

Referring now to the accompanying drawings the corresponding parts throughout the two figures are designated as the same reference numerals.

In FIG. 1, there is shown a fuel cooling device 10 for an automotive vehicle which is equipped with an air conditioner 12 having a refrigerant evaporator 14. The evaporator 14 is provided with a reservoir 16 to accumulate water drops which are condensed on evaporator fins 14'. The fuel cooling device 10 includes a heat exchanger, in the form of a liquid container 18, to which cool water accumulated in the reservoir 16 is supplied through a conduit 20. A fuel supply pipe 22 which leads from a fuel tank 24 to an engine output control device (not shown), such as a carburettor, extends through the liquid container 18 so that the fuel supply pipe 22 is exposed to and cooled by the cool water supply to and disposed in the liquid container 18. The liquid container 18 is provided at the upper portion thereof with a drain port 26 so as to drain off the relatively warm water collecting within the upper area of the liquid container 18. Thus the water remaining in the liquid container 18 is kept cool to cool fuel flowing through the fuel supply pipe 22. To assure supply of water in the reservoir to the liquid container, a pump 28 may be provided to deliver cool water from the reservoir 16 to the liquid container 18 irrespective of the arrangement of the reservoir 16 and the liquid container 18.

It will be understood that with cool water supplied from the reservoir 16 of the evaporator 14, the fuel flowing through the fuel supply pipe 22 is kept cool.

Referring next to FIG. 2 there is shown a second embodiment of a fuel cooling system in accordance with the present invention. The second embodiment is different from the first embodiment only in that a tubular member 18' has replaced the liquid container 18 of the first embodiment. Fuel supply pipe extends through the tubular member 18' as shown. The tubular member 18' is made of a water retainable porous material, such as sponge rubber. Conduit 20 connects reservoir 16 with the tubular member 18' so that cool water flows through the porous material. With the fuel cooling device according to the second embodiment, it will be appreciated that evaporation of water from the porous material will absorb heat from the fuel supply pipe 22 and increase cooling efficiency of the fuel cooling device.

From the preceding description of the two preferred embodiments of a fuel cooling device in accordance with the present invention, it should be noted that since cool water accumulated in the reservoir attached to a refrigerant evaporator of an air conditioner is employed to cool a fuel supply pipe, the cooling efficiency of the air conditioner is not affected.

It will also be noted that the fuel cooling device of the present invention is simple in construction and may be easily installed without considerable modification of conventional parts.

What is claimed is:

1. A fuel cooling device in an automotive vehicle equipped with an air conditioner including a refrigerant evaporator, comprising a heat exchanger disposed in contact with fuel for cooling thereof; conduit means fluidly connecting a reservoir and said heat exchanger; said reservoir being disposed to collect cool condensed water from the refrigerant evaporator.

2. A fuel cooling device as claimed in claim 1, in which said heat exchanger is in the form of a liquid container.

3. A fuel cooling device as claimed in claim 1, in which said heat exchanger is in the form of a tubular member of a tubular water retainable porous material.

4. A fuel cooling device as claimed in claim 2, in which a pump is connected to said conduit means to deliver water to said liquid container.

5. A fuel cooling device as claimed in claim 3, in which a pump is connected to said conduit means to deliver water to said tubular member.

* * * * *